L. S. BACON.
BONDING PIN.
APPLICATION FILED OCT. 27, 1905.
961,475.
Patented June 14, 1910.
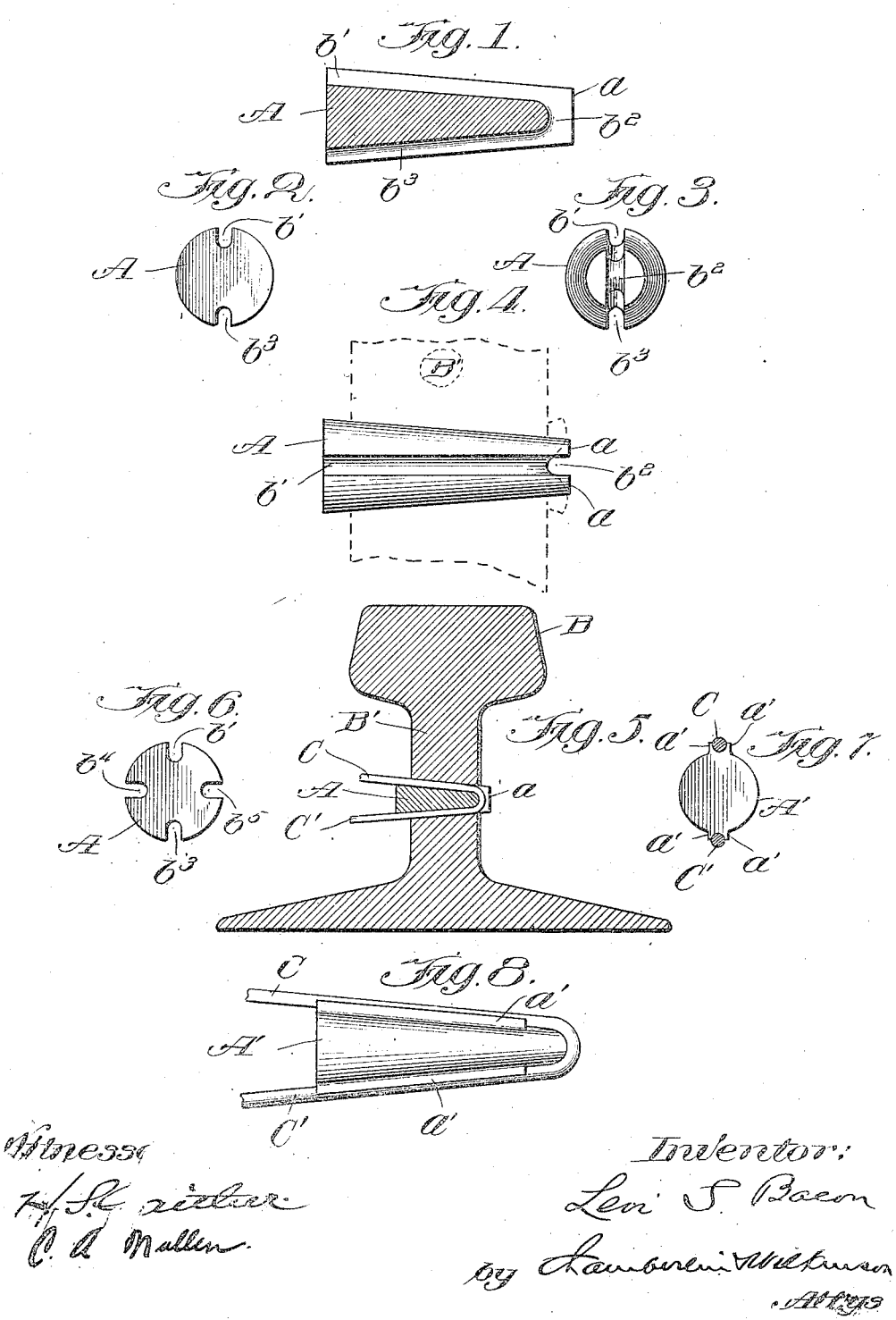

UNITED STATES PATENT OFFICE.

LEVI S. BACON, OF WASHINGTON, DISTRICT OF COLUMBIA, ASSIGNOR TO THE RAILROAD SUPPLY COMPANY, OF CHICAGO, ILLINOIS, A CORPORATION OF ILLINOIS.

BONDING-PIN.

961,475.  Specification of Letters Patent.  Patented June 14, 1910.

Application filed October 27, 1905. Serial No. 284,745.

*To all whom it may concern:*

Be it known that I, LEVI S. BACON, a citizen of the United States, residing at Washington, District of Columbia, have invented a certain new and useful Improvement in Bonding-Pins, and declare the following to be a full, clear, and exact description of the same, such as will enable others skilled in the art to which it pertains to make and use the same, reference being had to the accompanying drawings, which form a part of this specification.

My invention relates in general to improvements in electric connectors for uniting one or more relatively small electric conductors to a larger conductor, and more particularly to a bonding pin for securing a plurality of wires within holes formed in the adjoining rails of a railroad track.

In bonding rails it is necessary that the terminals of the bond should be closely and securely connected to the rails throughout a sufficient portion of their surfaces to insure the electrical contact requisite for the passage of the current. It is also necessary that the capacity of the bond should be sufficient to permit the passage of the current between the connected rails, and in order to secure the requisite capacity it is usual to provide a plurality of bonds between the adjoining rails which with the ordinary forms of bonding pins necessitates a separate hole and bonding pin to connect each wire to each rail.

An object of my invention is to provide a bonding pin capable of readily receiving the end of a conductor in such a manner as to form an extended contact surface after the pin has been driven into an opening through the rail, thereby coincidently with the driving of the pin into the rail forming an electrical connection between the conductor and rail of the necessary capacity.

A further object of my invention is to provide a bonding pin adapted for simultaneously connecting a plurality of small conductors to a larger conductor.

A further object of my invention is to provide a bonding pin which will be inexpensive in manufacture, simple in application, and efficient in use.

My invention consists primarily in a solid tapered bonding pin having a plurality of channels in its surface each of which may receive a small conductor or two of which may receive a portion of a single conductor.

My invention will be more fully described hereinafter with reference to the accompanying drawing, in which the same is illustrated as embodied in several convenient and practical forms, and in which,—

Figure 1 is a longitudinal section through a bonding pin embodying my invention; Fig. 2 an end elevational view of the bonding pin taken from the left in Fig. 1; Fig. 3 an end elevational view taken from the right in Fig. 1; Fig. 4 a plan view of the bonding pin shown in Figs. 1, 2 and 3, a portion of the rail and the end of the pin when applied to the rail being shown in dotted lines; Fig. 5 a transverse section of a railroad rail showing a bond connected thereto by my improved bonding pin; Figs. 6 and 7 end elevations of modified forms of my bonding pin; and Fig. 8 an elevational view showing a connecting wire in position on the modified embodiment of my invention shown in Fig. 7.

Similar reference characters are used to indicate similar parts in the several figures of the drawing.

Referring particularly to Figs. 1 to 5 of the drawing, reference letter A indicates one form of my improved bonding pin. The pin is preferably tapered so as to be readily driven within an opening in a railroad rail B or other electrical conductor. Longitudinal grooves $b'$ and $b^3$ are formed in the surface of the pin A, the depth of such grooves being preferably slightly less than the diameter of the smaller conductor C which is to be united to the larger conductor B. The grooves $b'$ and $b^3$ are preferably arranged in diametrical opposite portions of the surface of the pin and are preferably united at the smaller end of the pin by a transverse groove $b^2$. The groove $b^2$ divides the smaller end of the pin so as to form two lugs $a$, $a$ which may, if desired, be bent in opposite directions to form securing lugs after the pin has been driven into the opening in the larger conductor which in the present application of my invention is shown as a railroad rail B. The end wall $b^6$ of groove $b^2$ is conveniently rounded to form a seat for the bent portion of the conductor C as shown.

Fig. 6 illustrates a modified form of my improved bonding pin in which four longitudinal grooves $b'$, $b^3$, $b^4$ and $b^5$ are provided in the surface of the pin, they being for convenience shown as arranged at approximately 90° apart, although it is obvious that the grooves may be formed at any desired portions of the surface of the pin and at any desired distances apart.

In lieu of grooves the channels to receive the smaller conductor may be formed by projecting ribs upon the surface of the pin as shown in Figs. 7 and 8. In these figures $A'$ indicates the larger end of a bonding pin the surface of which is provided with pairs of parallel ribs $a'$, $a'$ located at such a distance apart as to form a channel of a depth and width corresponding to the diameter of the wire or other small conductor C, C'.

The application of my improved bonding pin is as follows: A small conductor or wire C is placed within one of the longitudinal grooves of the bonding pin and bent around the curved seat or end of the latter so as to be seated in the transverse groove $b^2$ and to extend backwardly in the longitudinal groove $b^3$. When the small conductor has been properly placed around the bonding pin the latter is driven into an opening in the larger conductor. When the larger conductor is a railroad rail the opening is preferably formed through the web $B'$ thereof. The lugs $a$, $a$, on either side of the groove $b^2$ may then be bent in opposite directions, as indicated in Fig. 4 to more securely retain the bonding pin in position within the opening in the rail web. It is of course obvious that instead of bending the wire C back upon itself after passing around the end of the pin, a separate wire may be placed in each of the grooves and both wires simultaneously united to the rail by driving the pin into the opening therein.

In the form of my invention shown in Fig. 6 one wire may be bent back so as to be seated in the opposite grooves $b'$, $b^3$, while another wire may be bent so as to be received within the opposite grooves $b^4$ and $b^5$. In the form of my invention shown in this figure four wires may be united to the rail by inserting the ends of the wires in the respective grooves.

The application of the modification shown in Figs. 7 and 8 is similar to that of the other embodiments of my invention, namely, the wire conductor is placed within the channel formed between a pair of the ribs $a'$, $a'$ and is then bent around the end of the pin so that a portion $C'$ thereof extends between the outer pair of ribs $a'$, $a'$ as clearly illustrated in Fig. 8.

From the foregoing description of my invention it will be observed that I have devised an improved bonding pin capable of simultaneously uniting a plurality of smaller conductors to a larger conductor when driven into an opening in the larger conductor, or capable of forcing two portions of the same small conductor into close contact with the surface surrounding an opening in the larger conductor and thereby insuring an extended electrical connection between the conductors. By forming the pin solid and tapered, the act of driving the same into an opening in a larger conductor coincidently forces the smaller conductor or conductors into close electrical contact with the wall around the opening in the larger conductor.

Having now fully described my invention, what I claim as new and desire to secure by Letters Patent is:

1. A bonding pin having a plurality of longitudinal grooves and a transverse groove across one end thereof and connecting the longitudinal grooves together.

2. A bonding pin having a pair of grooves connected by a transverse groove across one end of the pin.

3. The combination with a relatively large conductor having an opening therein, a bonding pin tightly engaging the surface around the opening in the large conductor and having connected channels extending longitudinally thereof and across one end, and a small conductor partially surrounding said pin and arranged in said channels.

4. The combination with a relatively large conductor having an opening therein, a bonding pin driven into said opening, said bonding pin having channels extending longitudinally on opposite sides thereof and a connecting channel across one end, and a small conductor looped about said bonding pin and lying within said channels.

5. The combination with a relatively large conductor having an opening therein, a tapered bonding pin driven into said opening, said bonding pin having longitudinally extending channels on opposite sides thereof and a connecting channel across the smaller end, and a small conductor looped about said pin and lying within said channels.

6. The combination with a relatively large conductor having an opening therein, a bonding pin arranged to be driven into said opening, said bonding pin having channels extending longitudinally on opposite sides thereof, and a small conductor looped about said bonding pin lengthwise thereof and lying in said channels.

In testimony whereof, I sign this specification in the presence of two witnesses.

LEVI S. BACON.

Witnesses:
EDWIN S. CLARKSON,
THOS. R. HEATH.